Patented Dec. 21, 1937

2,102,751

UNITED STATES PATENT OFFICE

2,102,751

PRODUCTION OF ACETALDEHYDE

Arno Scheuermann, Ludwigshafen - on - the-Rhine, Rudolf Brill, Heidelberg, and Gustav Wietzel, Mannheim, Germany, assignors to I. G. Farbenindustrie Aktiengesellschaft, Frankfort-on-the-Main, Germany No Drawing. Application February 27, 1936, Serial No. 66,052. In Germany March 5, 1935

4 Claims. (Cl. 260—139)

The present invention relates to an improved process for the production of acetaldehyde by the catalytic hydration of acetylene in the gas phase by means of a cadmium phosphate catalyst.

It has already been proposed to prepare acetaldehyde by reacting steam and acetylene with the aid of catalysts which contain cadmium, phosphorus, oxygen and if desired hydrogen in chemical combination.

We have now found that the said cadmium phosphate catalysts can be considerably improved by partially replacing the cadmium by at least one alkaline earth metal. In this manner there is obtained a prolongation of the duration of activity of the catalyst even at elevated temperature and a considerable improvement in the yields of aldehyde which is obtained in a very pure form. The content of alkaline earth metal in the catalysts may be varied within wide limits. A replacement of only a few per cent, say about 2 per cent, of cadmium by one of the alkaline earth metals is effective, but also catalysts in which even more than half of the cadmium has been replaced by one or more of the alkaline earth metals have a high activity and long life. If it is desired to obtain the acetaldehyde as pure as possible, it is preferable to start from phosphates in which the molecular proportion of $P_2O_5$ to MeO is 0.33 (MeO representing the average composition of the mixed cadmium and alkaline earth metal in the catalyst calculated as metal oxide).

The catalysts may be prepared in different ways. For example the phosphates may be precipitated from the solutions of the corresponding metal salts and a sodium phosphate solution together, consecutively or one on the other. Catalysts which give X-ray patterns similar to those of apatite are especially active.

The most favourable temperature for the activity of the catalysts is between 300° and 350° C., but higher temperatures up to about 400° C. may also be employed. In some cases, however, it is preferable to work first at lower temperatures, say at 250° to 300° C., and then gradually to increase the temperature up to 350° to 400° C.; an increase in the efficiency of the catalysts is thus obtained.

In the present process pure acetylene and also mixtures containing acetylene such as are obtained by the thermal decomposition of hydrocarbons, as for example the mixtures obtainable from methane by means of the electric arc, may be employed as starting material.

The following examples will further illustrate how our present invention may be carried out in practice but the invention is not restricted to these examples. The parts are by volume.

Example 1

A calcium phosphate catalyst containing 10 per cent of cadmium phosphate is prepared by precipitation of a corresponding amount of cadmium phosphate on calcium phosphate. A gas mixture of 14 per cent of acetylene and 86 per cent of hydrogen is led at 350° C. over the said catalyst at the rate of 160 parts of gas per hour per part of catalyst. Steam is added to the gas in the proportion of 1.7 parts of steam to each part of the said gas mixture. After operating for about eight days, a conversion of about 92 per cent (calculated on the acetylene introduced) is obtained of which more than 85 per cent leads to the formation of aldehyde. After about two and a half weeks, the conversion of gas into aldehyde is about 95 per cent (with very little acetic acid) continuously for a long period.

Example 2

A gas mixture of similar composition of that employed in Example 1 is led under the same conditions as to speed and proportion of gas to steam but at 300° C. over a catalyst which has been prepared by mutual precipitation of cadmium and calcium nitrate with a mixture of phosphoric acid and ammonia, corresponding to tertiary ammonia phosphate in the cold and which consists of 95 per cent of cadmium phosphate and 5 per cent of calcium phosphate. A yield of acetaldehyde of more than 80 per cent (calculated on the acetylene introduced) is maintained for several months.

Example 3

A catalyst consisting of 95 per cent of cadmium phosphate and 5 per cent of strontium phosphate is prepared by mutually precipitating a corresponding amount of cadmium nitrate and strontium nitrate by means of tertiary sodium phosphate in the cold. A gas mixture such as is formed by the splitting up of methane in the electric arc and which contains 15 per cent of acetylene in addition to hydrogen and methane is led together with steam in the ratio of gas to steam of 1:1.7 over the said catalyst at 350° C. at the rate of 160 parts of gas (without steam) to each part of catalyst per hour. The yield of aldehyde (calculated on the acetylene introduced) is 83 per cent after eight days, or more than 87 per cent after six days when employing a temperature of 400° C.

What we claim is:

1. In the production of acetaldehyde from acetylene by catalytic hydration in the gas phase by means of a cadmium phosphate catalyst the improvement which comprises employing a cadmium phosphate catalyst in which the cadmium is partially replaced by at least one alkaline earth metal.

2. In the production of acetaldehyde from acetylene by catalytic hydration in the gas phase by means of a cadmium phosphate catalyst the improvement which comprises employing a cadmium phosphate catalyst in which at least two per cent of the cadmium are replaced by at least one alkaline earth metal.

3. In the production of acetaldehyde from acetylene by catalytic hydration in the gas phase by means of a cadmium phosphate catalyst the improvement which comprises employing a cadmium phosphate catalyst in which the cadmium is partially replaced by at least one alkaline earth metal the molecular proportion of $P_2O_5$ to MeO being 0.33, MeO representing the average composition of the mixed cadmium and alkaline earth metal in the catalyst calculated as metal oxide.

4. In the production of acetaldehyde from acetylene by catalytic hydration in the gas phase by means of a cadmium phosphate catalyst the improvement which comprises employing a cadmium phosphate catalyst in which the cadmium is partially replaced by at least one alkaline earth metal the reaction being carried out at a temperature of about 350° C.

ARNO SCHEUERMANN.
RUDOLF BRILL.
GUSTAV WIETZEL.